H. W. BARTRAM & A. GILLIES.
MILKING MACHINE.
APPLICATION FILED DEC. 6, 1915.

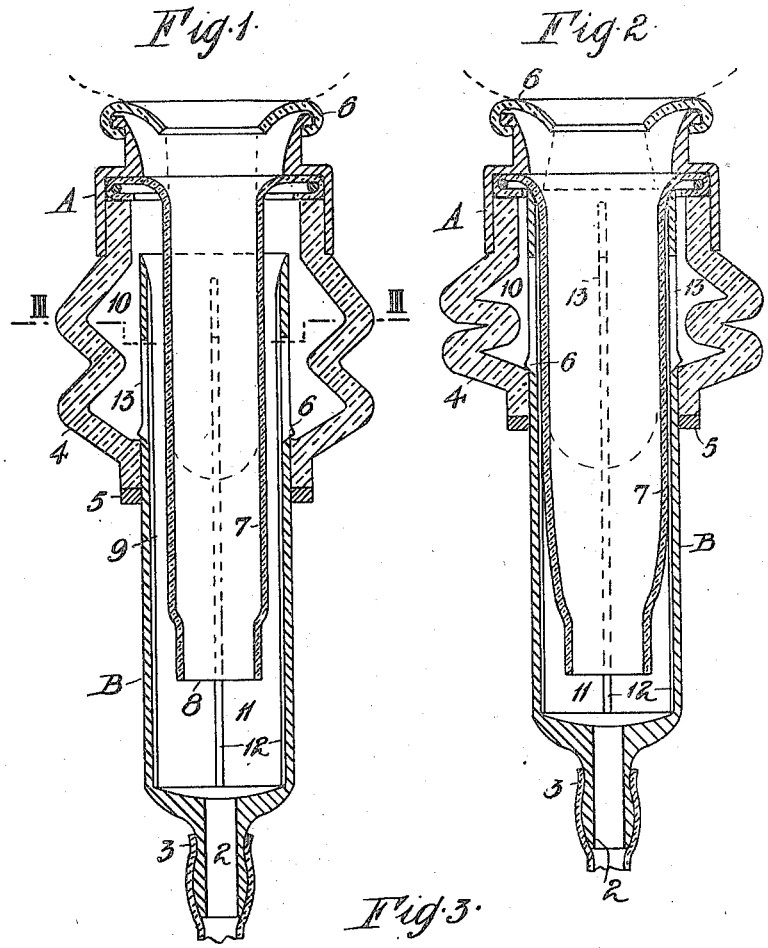
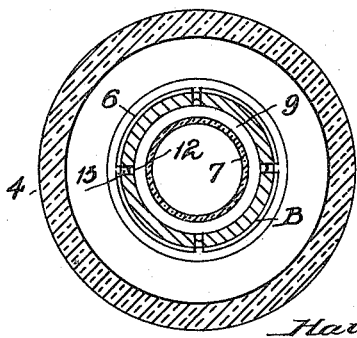

1,221,654.

Patented Apr. 3, 1917.
3 SHEETS—SHEET 2.

Witnesses:
Inventors
Haworth W. Bartram
Alexander Gillies
by
Attorney

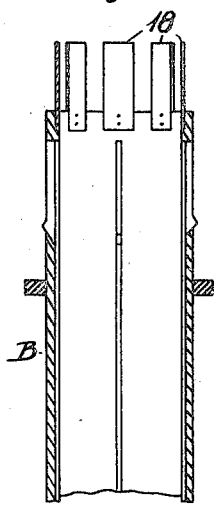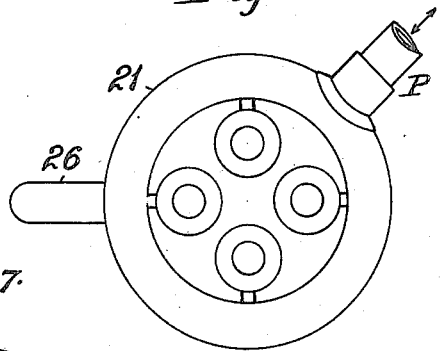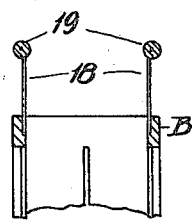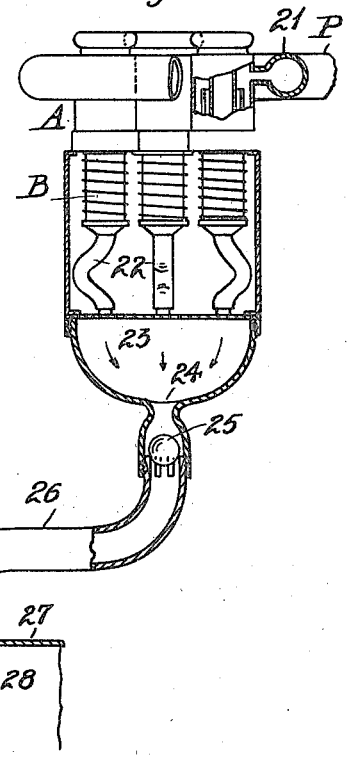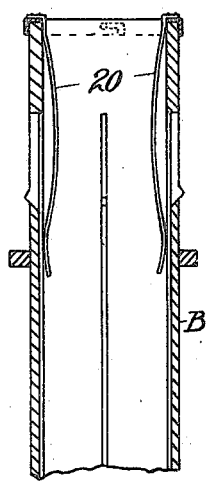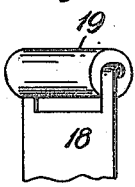

UNITED STATES PATENT OFFICE.

HAWORTH WILLIAM BARTRAM, OF MELBOURNE, AND ALEXANDER GILLIES, OF HEIDELBERG, VICTORIA, AUSTRALIA.

MILKING-MACHINE.

1,221,654.  Specification of Letters Patent.  Patented Apr. 3, 1917.

Application filed December 6, 1915. Serial No. 65,321.

*To all whom it may concern:*

Be it known that we, HAWORTH WILLIAM BARTRAM, a subject of the King of Great Britain, residing at 586–588 Bourke street, Melbourne, in the State of Victoria, Australia, and ALEXANDER GILLIES, a subject of the King of Great Britain, residing at Glencairn, Templestowe Road, Heidelberg, in the State of Victoria, Australia, have invented Improvements in or Relating to Milking-Machines, of which the following is a specification.

This invention consists of improvements in or relating to milking machines in which suitable means are provided for alternately admitting suction and air to the cups, and to such machines cups of the type stated which are in direct communication with the cow's teats so as to create pulsations without the employment of an entirely separated chamber such as is necessary to obtain pulsations in what are commonly known as "double-chambered" teat cups.

According to this invention improved means have been devised in order to apply pressure to the cow's teat when suction is in the cup and to remove such pressure when air is in the cup.

These objects are accomplished by the employment of a cup incorporating means having an alternating motion synchronizing with the pulsations, with or without the combination therewith of means within the cup to guide, protect and maintain the teat in position.

The means having the alternating motion consists essentially of a vertically reciprocating sleeve adapted to lift to exert pressure on the teat when suction is in the cup, and to move downwardly to remove such pressure when air is in the cup.

Various forms of sleeves as described hereinafter in detail may be employed to accomplish the above objects.

A further object of the vertically reciprocating sleeve is to cause the cup to bump against the cow's udder.

The means to guide, protect and maintain the teat in position consists preferably of a yielding teat shield which affords a glove-like grip around the teat.

The accompanying drawings depict various practical applications of the invention.

Figures 1 and 2 are vertical sections through one form of cup and illustrate the operations thereof.

Fig. 3 is a horizontal section on line III—III of Fig. 1.

Figs. 6 and 7 are vertical sectional views illustrating modifications of constructions of the sleeve.

Fig. 8 is an enlarged perspective view of part of Fig. 7.

Fig. 9 is a vertical section depicting a further modification of the sleeve.

Fig. 10 is a plan and Fig. 11 a vertical sectional elevation with portions removed and illustrating another exemplification of the application of the invention.

Figure 5:
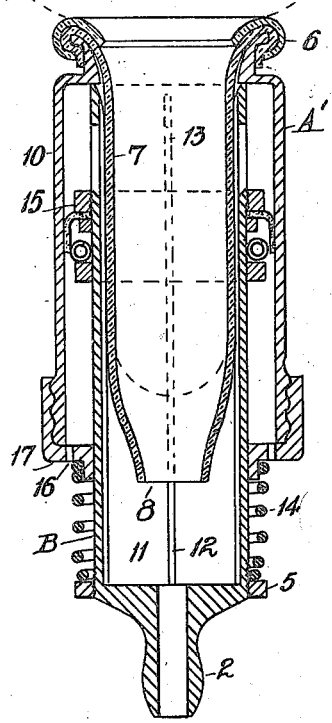
Figs. 4 and 5 are similar views to Figs. 1 and 2 illustrating a further form of cups.

By reference to the drawings it will be seen that the cup has a ferrule 2 which is connected with the milk tube 3 and in all the examples shown except Figs. 10 and 11 the pulsations are admitted to the cup through said tube.

Referring particularly to Figs. 1, 2 and 3 the rigid cylindrical casing members A and B of the cup are arranged so that the lower member B telescopes into the upper member A and both are connected together for vertical reciprocation of the lower member relative to the upper by means of a resilient or flexible folding element such as the rubber spring 4 shown. One end of this spring 4 fits tightly within the lower end of said casing member A while its lower end is fitted around the casing member B being terminally supported upon a collar 5 and retained in position by a circumferential bead 6 formed on said member B above the collar 5.

The casing member A forming the mouth of the cup is shown provided with a rubber mouthpiece 6 sprung over said mouth of the cup.

Means may be provided to guide the teat into the cup and for its protection and maintenance in position, such means preferably consisting of a yielding teat shield 7 formed of rubber or rubber reinforced by any suitable medium such as canvas, whalebone or springs.

The teat shield 7 is comparatively narrow in diameter and may be downwardly tapered and it is fixed to depend from the upper part of the cup and has an opening 8 at the lower end thus admitting the suction and air pulsations direct to the teat.

This shield may be secured between a shoulder on the member A of the cup and the upper end of the rubber spring 4 which end forms a seating for said shield.

The cow's teat is inserted in this shield 7 which by reason of its comparatively narrow diameter affords a yielding glove-like fit or grip around the teat, but permits the latter to expand.

By the construction shown the upper end of the sleeve extends well above the bottom of the rubber spring 4.

The casing member B hereinafter referred to as the sleeve B is of such a diameter that there is a comparatively narrow space 9 between it and the teats shown in dotted lines.

Means are employed to insure that the annular interior portion 10 of the cup on the outside of the upper part of the sleeve is permanently in communication with the central main portion 11 and the interior of the sleeve so that either suction or air according to the stroke of the pulsating means employed, is throughout the cup. For this purpose the interior surface of the sleeve is formed with longitudinal grooves or passages 12 or other means and with longitudinal slots 13 in the upper portion of said sleeve and communicating with said passages 12 whereby alternate suction and air within the cup operate also within the annular portion 10.

With this construction when the teat is in the shield and the cup is connected with suction, the teat and likewise the shield, distend and simultaneously the rubber spring 4 is compressed and the sleeve B lifts and applies a pressure to the teat as indicated in Fig. 2, and on release of the vacuum the sleeve moves downwardly.

The upward movement or lift of the sleeve moreover causes the teat cup to give a pronounced bump against the cow's udder thus producing the same effect as the natural bumping of a suckling calf whereby the udder is stimulated and the cow is induced to freely yield her milk.

Figure 4:
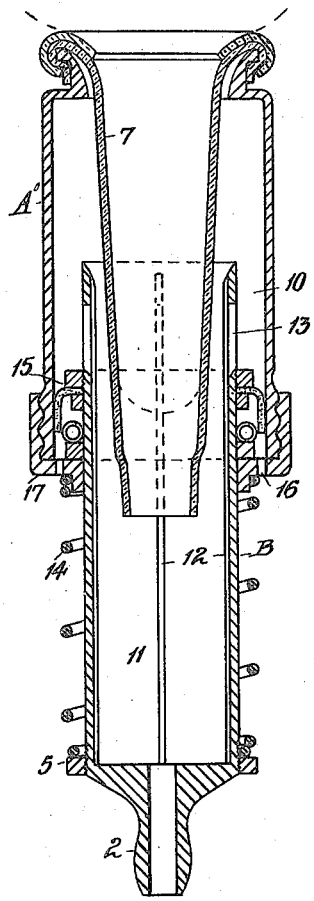

Referring now to Figs. 4 and 5 in which parts corresponding to those previously described bear similar reference characters, the modifications shown consist in the arrangement of a coil spring 14 to return the sleeve B similarly to the action of the rubber spring 4 in Figs. 1, 2 and 3, and an external piston like gland or head 15, located some distance below the top of the sleeve B and open on the underside to the atmosphere by means of ports 16 in the bottom of the casing member A′ which latter is comparatively long. Said head slides in contact with the casing member A′ so as to insure an air-tight joint between same and the sleeve B. The spring 14 may be arranged between an adjustable collar 5 located on the lower part of the sleeve B and the bottom 17 of the casing member A′.

By reason of the passages 12 and slots 13 the annular portion 10 of the cup is always in communication with the main central portion 11 whereby alternate suction and air within the cup operate upon the upper surface of the piston-like gland. Thus suction lifts or draws the sleeve upwardly and applies pressure to the teat and the spring 14 forces the sleeve down and removes the pressure from the teat when air is in the cup.

According to the modified construction shown in Fig. 6 the vertically reciprocating sleeve B is provided at its upper end with springs 18.

The springs moreover may be provided with small rollers 19 (Figs. 7 and 8) which slide in contact with the shield around the cow's teat.

According to Fig. 9 the sleeve B is rigid, but is provided internally with one or more leaf springs 20 which apply pressure to the teat when the sleeve lifts, which pressure is removed when said sleeve moves downwardly as previously described.

Referring now to the construction shown in Figs. 10 and 11 the upper parts A of a set of cups are suitably supported as illustrated and are connected with a common chamber 21 connected with the pulsating pipe P. The bottoms of the sleeves B are connected by flexible tubes 22 with a chamber 23 in the discharge end 24 of which is a suction operated valve 25 adapted when suction is in the cup to close said discharge end and when air is in the cup to open it so as to allow the milk to flow into a discharge pipe 26 leading to and supported upon a milk receptacle 27.

It will be evident without illustration that each cup may be connected at the discharge end with an independent but smaller type of valve as illustrated.

The pipe 26 and with it the cups supported thereon are adapted to be vertically adjusted and for this purpose said pipe may extend through a downwardly projecting funnel 28 in the receptacle 27 provided with a ring or loop 29 through which the pipe passes and which grips and supports said pipe when the latter is released.

We claim:—

1. In milking machines having cups of the kind specified, a cup incorporating means having alternating vertical motion and adapted to lift when suction is in the cup to exert pressure on the teat.

2. In milking machines having cups of the kind specified, a cup incorporating means having alternating vertical motion and when suction is in the cup exerting pressure on the teat, in combination with means to guide and maintain the teat in position within the cup.

3. In milking machines having cups of the kind specified, a cup incorporating means having alternating vertical motion and when suction is in the cup exerting pressure on the teat, in combination with a yielding teat shield.

4. In milking machines having cups of the kind specified, a cup comprising an upper casing and a rigid sleeve reciprocating vertically and adapted to lift when suction is in the cup to exert pressure on the teat and to move downwardly when air is in the cup to remove such pressure, in combination with a yielding teat shield.

5. In milking machines having cups of the kind specified, a cup comprising an upper casing and a rigid sleeve reciprocating vertically and adapted to lift when suction is in the cup to exert pressure on the teat, spring means exerting a downward pressure on said sleeve to remove such pressure from the teat when air is in the cup, in combination with a yielding teat-shield.

6. In a milking machine, a cup comprising a rigid casing member, a rigid sleeve member and a resilient or flexible element connecting said members, the upper end of said sleeve extending above the lower end of said element, means by which alternate suction and air are communicated to said cup throughout the same, in combination with a yielding teat shield.

7. In a milking machine, a cup comprising a rigid upper casing member, a rigid sleeve member reciprocating vertically and adapted to lift when suction is in the cup to exert pressure on the teat and also to cause said cup to bump against the cow's udder, and spring means exerting a downward pressure on said sleeve to remove such pressure from the teat when air is in the cup, in combination with a yielding teat shield.

8. In a milking machine, a cup comprising a comparatively long rigid upper casing member, and a rigid sleeve extending upwardly therein and provided externally with a piston head, means to introduce suction and air alternately within the cup, means to enable the upper surface only of said piston head to be brought into communication alternately with the suction and air in the cup, and a spring adapted to exert a downward pressure on said sleeve, in combination with a yielding teat shield.

9. In a milking machine, a cup having a rigid upper casing member, a rigid sleeve casing member extending upwardly into said upper member and formed at the bottom with a milk discharge ferrule, means to introduce suction and air alternately through said ferrule into and throughout the cup, said sleeve being provided with an external piston head and adapted to lift by suction within the cup, and a spring exerting a downward pressure on said sleeve, in combination with a yielding teat shield.

10. In a milking machine a cup having a rigid upper casing member, a rigid sleeve member extending upwardly into said upper member, said sleeve having an external piston head on that portion thereof which lies within said casing and also having air passages, and said casing having air ports below said piston head, and a spring exerting a downward pressure on said sleeve, in combination with a yielding teat shield forming a guide for the teat, said shield being open at the bottom and depending from the upper part of the cup and of such a diameter as to afford a glove-like grip on the teat.

11. In a milking machine, a cup having a rigid upper casing member, a rigid casing sleeve member reciprocating vertically in said upper member and provided internally with springs, means to introduce suction and air alternately into said cup, said sleeve being adapted to lift when suction is in the cup to exert pressure on the teat, and spring means exerting a downward pressure on said sleeve to remove such pressure from the teat when air is in the cup, in combination with a yielding teat shield.

12. In a milking machine, the combination of a cup, means to introduce suction and air alternately into said cup, a pulsating tube connected with the upper part of the cup, a milk discharge tube, and a valve connected with the bottom of the cup and with said milk discharge tube, said valve being controlled by the suction and air in the cup.

13. A teat cup for pulsating milking machines, embodying relatively fixed and movable telescoping members, the latter of which is adapted to lift when suction is in the cup to exert pressure on the teat, and means to move said latter member downwardly when air is in the cup to remove such pressure.

14. A teat cup for pulsating milking machines, embodying relatively fixed and movable telescoping members, the latter of which is adapted to lift when suction is in the cup to exert pressure on the teat, and means to move said latter member downwardly when air is in the cup to remove such pressure; in combination with a yielding teat sleeve connected to the fixed member.

15. A teat cup for pulsating milking machines, embodying relatively fixed and movable telescoping members, the movable member having an external piston head and being arranged to lift when suction is in the cup to exert pressure on the teat and to move downwardly when air is in the cup to remove such pressure.

16. A teat cup for pulsating milking machines, embodying relatively fixed and movable telescoping members, the movable member having an external piston head and being arranged to lift when suction is in the cup to exert pressure on the teat and to move downwardly when air is in the cup to remove such pressure; and means to enable the upper surface only of the piston head to be brought into communication alternately with the suction and air in the cup.

17. A teat cup for pulsating milking machines, embodying relatively fixed and movable telescoping members, the movable member having an external piston head and being arranged to lift when suction is in the cup to exert pressure on the teat and to move downwardly when air is in the cup to remove such pressure; said movable member having air passages in and through the same, and said fixed member having air ports below said piston head, so as to enable the upper surface only of the piston head to be brought into communication alternately with the suction and air in the cup.

In testimony whereof we have hereunto set our hands.

HAWORTH WILLIAM BARTRAM.
ALEXANDER GILLIES.